(12) United States Patent
Ohto et al.

(10) Patent No.: US 10,059,616 B2
(45) Date of Patent: Aug. 28, 2018

(54) SHAPE MEASURING DEVICE, SHAPE MEASURING METHOD, AND GLASS PLATE MANUFACTURING METHOD

(71) Applicant: ASAHI GLASS COMPANY, LIMITED, Chiyoda-ku (JP)

(72) Inventors: Kimiaki Ohto, Tokyo (JP); Akira Sugahara, Tokyo (JP); Yusuke Arita, Tokyo (JP); Minoru Ikenota, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 107 days.

(21) Appl. No.: 15/188,298

(22) Filed: Jun. 21, 2016

(65) Prior Publication Data

US 2016/0297704 A1 Oct. 13, 2016

Related U.S. Application Data

(63) Continuation of application No. PCT/JP2014/083996, filed on Dec. 22, 2014.

(30) Foreign Application Priority Data

Dec. 27, 2013 (JP) .................................. 2013-272661

(51) Int. Cl.
*C03B 18/18* (2006.01)
*G01B 11/25* (2006.01)
*C03B 25/08* (2006.01)

(52) U.S. Cl.
CPC .............. *C03B 18/18* (2013.01); *G01B 11/25* (2013.01); *G01B 11/2513* (2013.01); *C03B 25/08* (2013.01)

(58) Field of Classification Search
CPC ..... G01B 11/25; G01B 11/2513; C03B 25/08; C03B 18/18
See application file for complete search history.

(56) References Cited

U.S. PATENT DOCUMENTS 5,867,250 A 2/1999 Baron
6,392,754 B1 5/2002 Pingel et al.
(Continued)

FOREIGN PATENT DOCUMENTS

JP 8-304054 11/1996
JP 2001-502800 2/2001
(Continued)

OTHER PUBLICATIONS

International Search Report dated Mar. 31, 2015 in PCT/JP2014/083996 filed on Dec. 22, 2014 (with English translation).
(Continued)

*Primary Examiner* — John Strege
(74) *Attorney, Agent, or Firm* — Oblon, McClelland, Maier & Neustadt, L.L.P.

(57) ABSTRACT

A shape measuring device includes: a predetermined pattern; an image pick-up section that captures reflected images of the predetermined pattern on the front face and back face of a transparent measurement object; a calculating section that calculates an inclination angle of at least the front face or the back face from the reflected images; and a determining section that determines a shape of at least the front face or the back face. The predetermined pattern includes a plurality of elements, and one end and the other end of each element of the plurality of elements, which are formed in a direction perpendicular to the extension direction, are deviated from each other in the extension direction.

14 Claims, 6 Drawing Sheets

(56) References Cited

U.S. PATENT DOCUMENTS

| | | |
|---|---|---|
| 7,394,536 B2 | 7/2008 | Sonda et al. |
| 9,086,384 B2 | 7/2015 | Ohto |
| 2005/0036672 A1 | 2/2005 | Chen et al. |
| 2005/0238237 A1 | 10/2005 | Haeusler et al. |
| 2007/0091319 A1* | 4/2007 | Sonda ................ G01N 21/896 356/600 |
| 2007/0165243 A1 | 7/2007 | Kang et al. |
| 2010/0309328 A1* | 12/2010 | Ehrick ............... G01B 11/2509 348/222.1 |
| 2013/0094714 A1* | 4/2013 | Ohto ..................... G01B 11/24 382/106 |
| 2013/0098109 A1* | 4/2013 | Ohto ..................... C03B 25/08 65/29.14 |
| 2013/0125408 A1 | 5/2013 | Atwell et al. |
| 2015/0218035 A1* | 8/2015 | Ishikawa ................ C03B 18/02 65/28 |

FOREIGN PATENT DOCUMENTS

| | | |
|---|---|---|
| JP | 2005-345383 | 12/2005 |
| WO | WO 2011/158869 A1 | 12/2011 |

OTHER PUBLICATIONS

Written Opinion dated Mar. 31, 2015 in PCT/JP2014/083996 filed on Dec. 22, 2014.
Extended European Search Report dated Apr. 28, 2017 in European Patent Application No. 14873328.0.

* cited by examiner

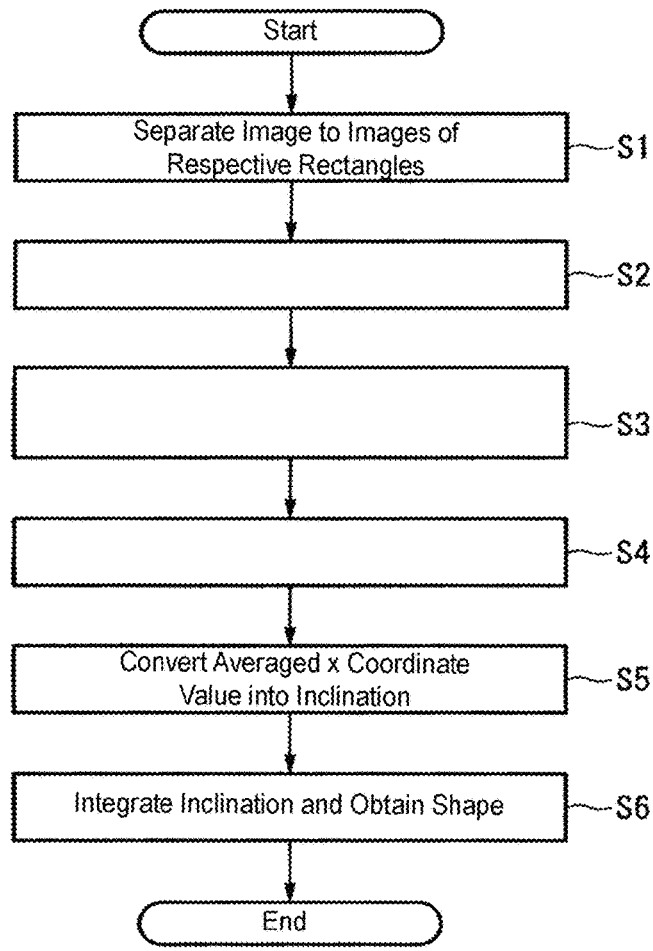

FIG. 6

S2: Calculate Straight Line Passing through Center of Gravity of Rectangle and being Parallel with Long side of Rectangle S3: Calculate x Coordinate value of Point Located on Calculated Straight Line and Having Predetermined y Coordinate Value and then Perform Conversion into Deviation of Position of Rectangle in y-axis Direction S4: Obtain Average of Positional Deviations of Rectangles Adjacent to Each Other in y-axis Direction

SHAPE MEASURING DEVICE, SHAPE MEASURING METHOD, AND GLASS PLATE MANUFACTURING METHOD

TECHNICAL FIELD

The present invention relates to a shape measuring device, a shape measuring method and a method for manufacturing a glass plate.

BACKGROUND ART

A measuring device for measuring the shape of the front face or the back face of a transparent measurement object, such as a glass plate, is available conventionally. This measuring device has a liner pattern disposed above the measurement object and calculates the shape of the front face or the back face of the measurement object by obtaining the local normal vector of the front face or the back face from the position of a reflected image viewed from a direction perpendicular to the extension direction of the pattern (refer to Patent Document 1, for example.)

PRIOR ART DOCUMENT

Patent Document

Patent Document 1: WO 2011/158869

SUMMARY OF THE INVENTION

Problem to be Solved by the Invention

The measuring device according to Patent Document 1, however, has a problem that when the thickness of a measurement object is thin, the reflected image on the front face is overlapped with the reflected image on the back face and the calculation accuracy of the position in the plate thickness direction becomes low.

The present invention has been made in view of the above-mentioned situations and is intended to provide a shape measuring device, a shape measuring method and a method for manufacturing a glass plate, which are capable of accurately calculating the position of the front face or the back face of a measurement object in the thickness direction even if the thickness of the measurement is thin.

Means for Solving the Problem (1) The present invention is accomplished in order to solve the above problems, and one aspect of the present invention is a shape measuring device including: a predetermined pattern disposed on one side or the other side facing a measurement object which is a transparent flat plate; an image pick-up section that is configured such that respective reflected images of the predetermined pattern on a front face and back face of the measurement object is separated in a separation direction perpendicular to an extension direction of the predetermined pattern, the image pick-up section being configured to capture the reflected images of the predetermined pattern on the front face and back face of the measurement object to thereby generate an image including the respective reflected images on the front face and back face; a calculating section that calculates an inclination angle of at least the front face or the back face from the reflected images captured by the image pick-up section on the basis of a positional relation between the measurement object, the predetermined pattern and the image pick-up section; and a determining section that determines a shape of at least the front face or the back face on the basis of the inclination angle calculated, wherein the predetermined pattern includes a plurality of elements, and one end and the other end of each element of the plurality of elements, which are formed in a direction perpendicular to the extension direction, are deviated from each other in the extension direction.

(2) In addition, another aspect of the present invention is the shape measuring device according to (1), wherein the each element of the plurality of elements is arranged repeatedly in the extension direction.

(3) In addition, another aspect of the present invention is the shape measuring device according to (1) or (2), wherein the each element of the plurality of elements is formed into a long shape.

(4) In addition, another aspect of the present invention is the shape measuring device according to any one of (1) to (3), wherein, in a first element and second element of the plurality of elements, the first element and second element being adjacent to each other, the first element is formed so as to be deviated in a first direction which is one direction along the extension direction from one end to the other end of the first element, and the second element is formed so as to be deviated in a second direction which is the other direction along the extension direction from one end to the other end on the side of the first element.

(5) In addition, another aspect of the present invention is the shape measuring device according to any one of (1) to (4), wherein the each element of the plurality of elements is formed so as to be separated from one another.

(6) In addition, another aspect of the present invention is the shape measuring device according to any one of (1) to (4), wherein the predetermined pattern is formed into a sine wave shape by the plurality of elements.

(7) In addition, another aspect of the present invention is the shape measuring device according to any one of (1) to (6), wherein the predetermined pattern has a first pattern string formed of the plurality of elements and a second pattern string disposed in parallel with the first pattern string, the second pattern string being linearly symmetrical with the first pattern string.

(8) In addition, another aspect of the present invention is a shape measuring method including: a first step of capturing respective reflected images of a predetermined pattern on a front face and back face of a measurement object as an image separated in a separation direction perpendicular to an extension direction of the predetermined pattern, the predetermined pattern being disposed on one side or the other side facing the measurement object which is a transparent flat plate; a second step of calculating an inclination angle of at least the front face or the back face from the reflected images captured in the first step on the basis of a positional relation between the measurement object, the predetermined pattern and a position where the images have been captured; and a third step of determining a shape of at least the front face or the back face on the basis of the inclination angle calculated, wherein the predetermined pattern includes a plurality of elements, and one end and the other end of each element of the plurality of elements, which are formed in a direction perpendicular to the extension direction, are deviated from each other in the extension direction.

(9) In addition, another aspect of the present invention is the shape measuring method according to (8), wherein the each element of the plurality of elements is arranged repeatedly in the extension direction.

(10) In addition, another aspect of the present invention is the shape measuring method according to (8) or (9), wherein the each element of the plurality of elements is formed into a long shape.

(11) In addition, another aspect of the present invention is the shape measuring method according to any one of (8) to (10), wherein, in a first element and second element of the plurality of elements, the first element and second element being adjacent to each other, the first element is formed so as to be deviated in a first direction which is one direction along the extension direction from one end to the other end of the first element, and the second element is formed so as to be deviated in a second direction which is the other direction along the extension direction from one end to the other end on the side of the first element.

(12) In addition, another aspect of the present invention is the shape measuring method according to any one of (8) to (11), wherein the each element of the plurality of elements is formed so as to be separated from one another.

(13) In addition, another aspect of the present invention is the shape measuring method according to any one of (8) to (11), wherein the predetermined pattern is formed into a sine wave shape by the plurality of elements.

(14) In addition, another aspect of the present invention is a method for manufacturing a glass plate, including: a melting step of melting a glass raw material to obtain molten glass; a forming step of forming the molten glass into a continuous plate-shaped glass ribbon; a slow-cooling step of gradually cooling the glass ribbon by moving the glass ribbon; a measuring step of measuring a shape of a front face of the glass ribbon; a cutting step of cutting the glass ribbon; and a controlling step of controlling slow-cooling conditions in the slow-cooling step on the basis of a measurement result in the measuring step, wherein the measuring step is a step in which measurement is performed by using the shape measuring method according to any one of (8) to (13) in which the glass ribbon is used as the measurement object.

Advantage of the Invention

In the present invention, the position of the front face or the back face of a measurement object in the thickness direction can be calculated accurately even if the thickness of the measurement object is thin.

BRIEF DESCRIPTION OF THE DRAWINGS

FIG. 6 is a flow chart explaining the operation of a front face position calculating section 33 according to the first embodiment.

MODE FOR CARRYING OUT THE INVENTION

First Embodiment

Figure 1:
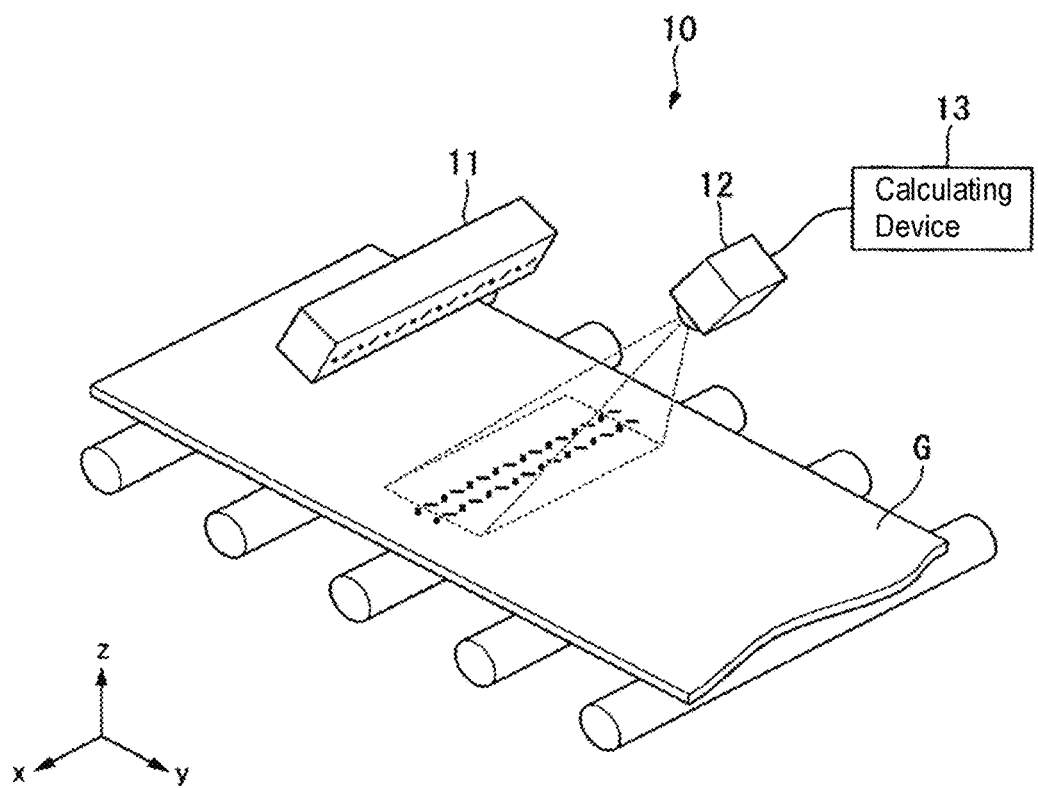
FIG. 1 is a schematic view showing the configuration of a shape measuring device 10 according to a first embodiment of the present invention.

A first embodiment of the present invention is described below referring to the drawings. FIG. 1 is a schematic view showing the configuration of a shape measuring device 10 according to one embodiment of the present invention. On the front face and the back face of a transparent measurement object, such as a glass plate G moving on a plurality of rotating rollers, the shape measuring device 10 calculates the shapes of the front face and the back face of the measurement object by using the reflected images of the pattern printed on a pattern display member 11. In FIG. 1, the direction in which the glass plate G moves is referred to as a y-axis, the axis along the front face of the glass plate G and perpendicular to the y-axis is referred to as an x-axis, and the direction (hereafter referred to as a plate thickness direction or a thickness direction) perpendicular to the front face of the glass plate G is referred to as a z-axis.

The shape measuring device 10 includes a camera 12 and a calculating device 13. The camera 12 captures the images of the pattern reflected by the front face and the back face of the measurement object. The calculating device 13 calculates the shapes of the front face and the back face of the measurement object by using the reflected images captured by the camera 12.

Figure 2:
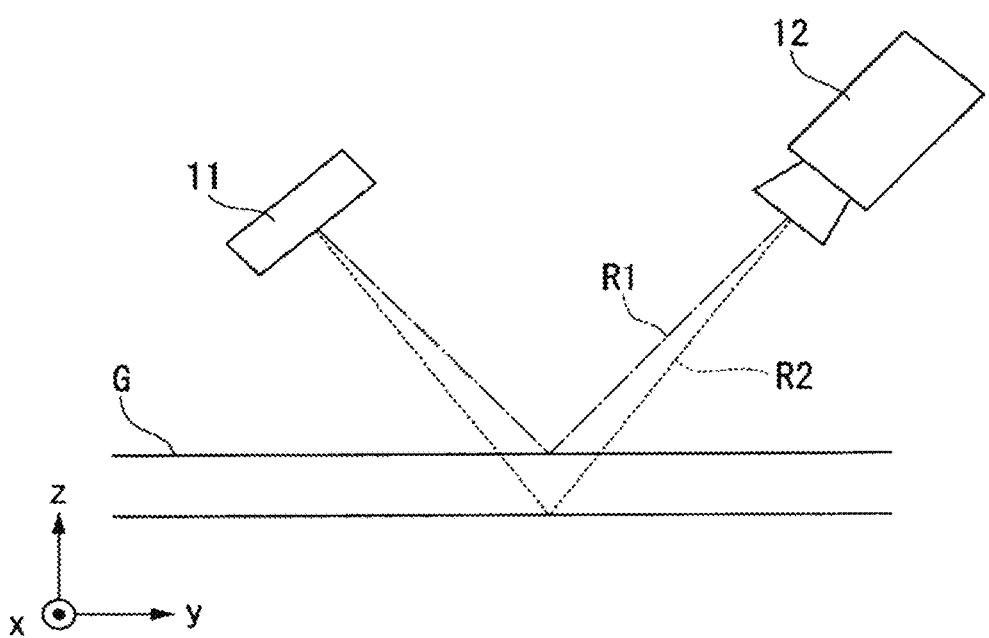
FIG. 2 is a view showing the positional relation between a pattern display member 11 and a camera 12 according to the first embodiment.

FIG. 2 is a view showing the positional relation between the pattern display member 11 and the camera 12. In FIG. 2, the alternate long and short dashed line indicated by sign R1 represents a ray for forming an image of the pattern of the pattern display member 11 reflected by the front face of the glass plate G. Furthermore, the broken line indicated by sign R2 represents a ray for forming an image of the pattern of the pattern display member 11 reflected by the back face of the glass plate G. As shown in FIG. 2, the camera 12 is provided so that the reflected images of the pattern of the pattern display member 11 on the front face of the glass plate G and reflected images of the pattern of the pattern display member 11 on the front face of the glass plate G are captured. Since the camera is provided as described above, the reflected image on the back face is captured by the camera 12 as an image deviated from the reflected image on the front face in a direction perpendicular to the extension direction of the pattern of the pattern display member 11. Although the pattern display member 11 and the camera 12 are provided on the upper side, that is, one side facing the glass plate G in FIG. 2, they may be provided on the lower side, that is, the other side facing the glass plate G.

Figure 3:
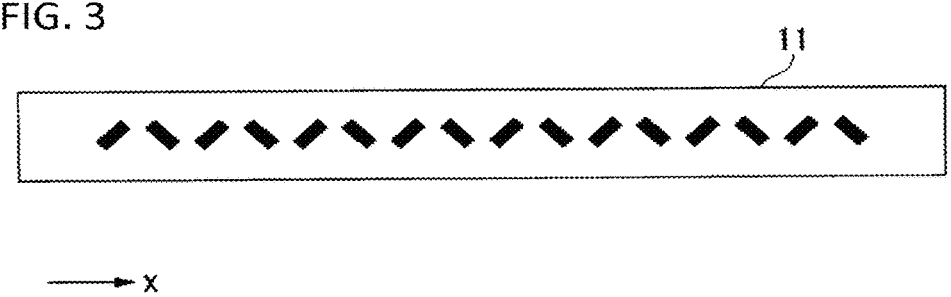
FIG. 3 is a view showing a pattern printed on the pattern display member 11 according to the first embodiment.

FIG. 3 is a view showing a pattern printed on the pattern display member 11. As shown in FIG. 3, in the pattern printed on the pattern display member 11, a rectangle (first element) inclined to the right and a rectangle (second element) inclined to the left are arranged alternately and repeatedly. However, the elements of the pattern are not limited to rectangles, but they may be long shape elements, such as parallelograms or rectangles and parallelograms with circular corners. The arrangement direction of the pattern is the extension direction of the pattern display member 11, that is, the x-axis direction. In the case where the reflected images of the pattern of the pattern display member 11 on the front face and the back face of the glass plate G are captured, the deviation direction (separation direction) of the reflected image on the back face from the reflected image on the front face is the y-axis direction in FIG. 2. In other words, the deviation direction is a direction perpendicular to the x-axis direction that is the extension direction of the pattern of the pattern display member 11. Since each rectangle on the pattern display member 11 is inclined, one end and the other end of the rectangle in the direction perpendicular to the x-axis direction are deviated in the x-axis direction (the extension direction of the pattern display member 11). Hence, the reflected image on the front face can be prevented from being overlapped with the reflected image on the back face even if the thickness is thin.

Figure 4:
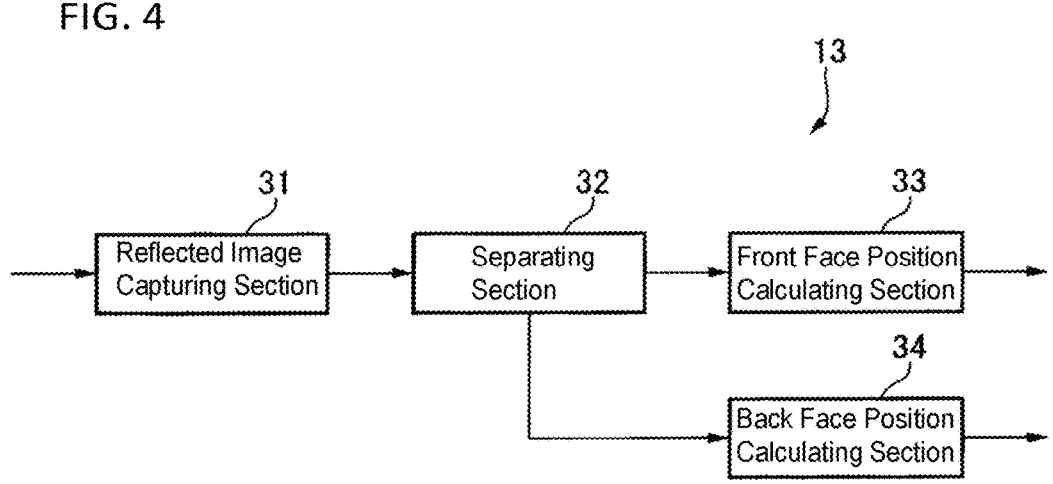
FIG. 4 is a schematic block diagram showing the configuration of an calculating device 13 according to the first embodiment.

FIG. 4 is a schematic block diagram showing the configuration of the calculating device 13. The calculating device 13 includes a reflected image capturing section 31, a separating section 32, a front face position calculating section 33 and a back face position calculating section 34. The reflected image capturing section 31 captures images including the reflected images captured by the camera 12. The separating section 32 separates the reflected image on the front face and the reflected image on the back face from the images captured by the camera 12. On the assumption that the reflected image on the front face is not overlapped with the reflected image on the back face, the separating section 32 in this embodiment detects the space between these reflected images and separates the images.

The front face position calculating section 33 calculates the value representing the position of the image corresponding to each rectangle of the pattern in the reflected image on the front face separated by the separating section 32, the position being in a direction perpendicular to the arrangement direction of the pattern. The front face position calculating section 33 converts the value representing the position into the local inclination (inclination angle) of the front face. As a method for the conversion, a method using an LUT (look-up table) having been stored in advance may be used, or a method in which calculation is carried out using a relational expression between the value representing the position in the direction perpendicular to the arrangement direction of the pattern and the value representing the local inclination of the front face may be used.

The LUT and the relational expression correspond to the positional relation between the front face of the glass plate G, the pattern display member 11 and the camera 12. More specifically, the inclination of the front face of the glass plate G is calculated by using the fact that, when a ray enters the front face of the glass plate G from the rectangle of the pattern display member 11 at a predetermined incident angle and then reflected by the front face of the glass plate G and the reflected ray is emitted at a reflection angle equal to the incident angle, the reflection ray reaches the camera 12. Furthermore, although a partial differential value of the z coordinate value of the front face in FIG. 1 with respect to the y coordinate value is used as the value representing the local inclination of the front face, the y and z components of the local normal vector of the front face may also be used. The front face position calculating section 33 calculates the distribution (shape) of the front face positions (z coordinate values) in the y-axis direction by integrating the calculated value representing the local inclination of the front face in the y-axis direction. Hence, the waviness or the like of the glass plate G in the y-axis direction can be detected.

The back face position calculating section 34 calculates the value representing the position of the image corresponding to each rectangle of the pattern in the reflected image on the back face separated by the separating section 32, the position being in the direction perpendicular to the arrangement direction of the pattern. The back face position calculating section 34 converts the value representing the position into the local inclination (inclination angle) of the back face. As in the front face position calculating section 33, as a method for the conversion, a method using an LUT (look-up table) having been stored in advance may be used, or a method in which calculation is carried out using a relational expression between the value representing the position in the direction perpendicular to the arrangement direction of the pattern and the value representing the local inclination of the back face may be used.

As in the case of the front face, the LUT and the relational expression correspond to the positional relation between the back face of the glass plate G, the pattern display member 11 and the camera 12. Furthermore, although a partial differential value of the z coordinate value of the back face in FIG. 1 with respect to the y coordinate value is used as the value representing the local inclination of the back face, the y and z components of the local normal vector of the back face may also be used. The back face position calculating section 34 calculates the distribution (shape) of the back face positions (z coordinate values) in the y-axis direction by integrating the calculated value representing the local inclination of the back face in the y-axis direction. Hence, the waviness or the like of the glass plate G in the y-axis direction can be detected.

Figure 5:
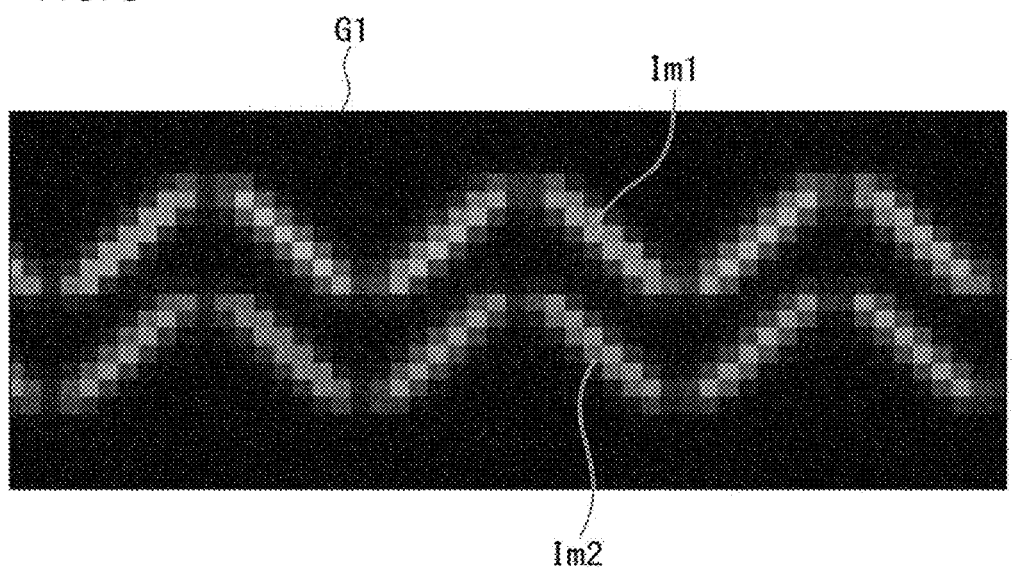
FIG. 5 is a view showing an example of a reflected image captured by the camera 12 according to the first embodiment.

FIG. 5 is a view showing an example of a reflected image captured by the camera 12. FIG. 5 shows an image G1 in which portions of the reflected images of the images captured by the camera 12 are enlarged. As shown in FIG. 5, a reflected image Im1 on the front face and a reflected image Im2 reflected on the back face are separated from each other.

FIG. 6 is a flow chart explaining the operation of the front face position calculating section 33. The front face position calculating section 33 separates the reflected image on the front face and separated by the separating section 32 to the reflected images of the respective rectangles constituting the pattern (S1). Since the rectangles constituting the pattern are separated from one another as shown in FIG. 3, the separation of the respective rectangles to the images can be performed easily by detecting the space between the reflected images.

Next, for each separated reflected image, the front face position calculating section 33 calculates the straight line passing through the center of gravity of the rectangle and being parallel with the long side of the rectangle (S2). For example, the front face position calculating section 33 carries out calculation from all the pixels constituting the image of the rectangle by using the least square method. At this time, weighting may be performed depending on the pixel value of each pixel. Next, the front face position calculating section 33 calculates the deviation of the x coordinate value of a point located on the straight line and having a predetermined y coordinate value. Next, the front face position calculating section 33 converts the deviation of the x coordinate value into the deviation of the position of the rectangle in the y-axis direction (S3). The deviation of the x coordinate value is a value obtained by subtracting the x coordinate value of the point for example at the time when the inclination of the front face having been stored in advance is "0" from the x coordinate value of the point. Furthermore, the conversion of the deviation of the x coordinate value of the point into the deviation of the position of the rectangle in the y-axis direction is performed on the basis of the inclination of the rectangle. In the case where the rectangle is inclined, for example, 30 degrees with respect to the y-axis, the deviation of the position of the rectangle in the y-axis direction is twice as large as the deviation of the x coordinate value of the point. At this time, plus or minus depending on the inclination of the rectangle is also considered.

Next, the front face position calculating section 33 obtains the average of the deviations of the y coordinate values calculated with respect to the rectangles adjacent to each other (S4). In other words, the front face position calculating section obtains the average of the deviation of the y coordinate value calculated with respect to the rectangle inclined to the right and the deviation of the y coordinate value calculated with respect to the rectangle adjacent thereto and inclined to the left. Next, the front face position calculating section 33 converts the averaged y coordinate value into the inclination of the front face (S5). Then, the front face position calculating section 33 integrates the inclination of the front face in the y-axis direction, thereby obtaining the distribution (shape) of the z coordinate values of the front face (S6).

Since the average of the deviation of the position calculated with respect to the rectangle inclined to the right in the y-axis direction and the deviation of the position calculated with respect to the rectangle adjacent thereto and inclined to the left in the y-axis direction is obtained as described above, errors occurring, for example, when the installation positions of the pattern display member 11 and the camera 12 are deviated, can be suppressed. For example, when the installation position of the pattern display member 11 is deviated in the x-axis direction, the reflected image by the rectangle inclined to the right and the reflected image by the rectangle inclined to the left are deviated by the amount corresponding to the deviation of the installation position. Furthermore, as the result of the conversion in the above-mentioned step S3, the deviation of the position of the rectangle inclined to the right in the y-axis direction and the deviation of the position of the rectangle inclined to the left in the y-axis direction include errors reversed in plus/minus polarity. Hence, errors that are generated, for example, when the installation position is deviated, can be canceled and suppressed by obtaining the average of the deviations.

Figure 7:
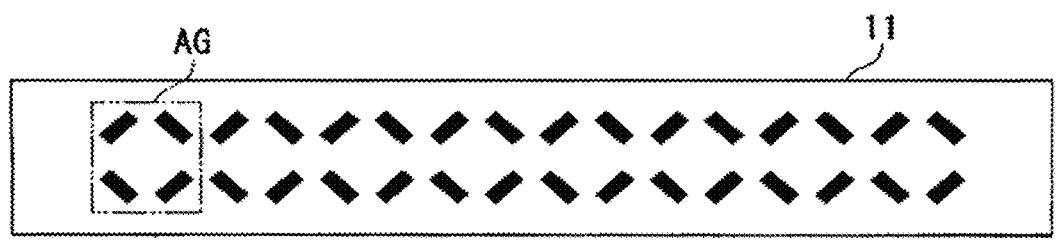
FIG. 7 is a view showing another example (example 1) of the pattern printed on the pattern display member 11 according to the first embodiment.

FIG. 7 is a view showing another example (example 1) of the pattern printed on the pattern display member 11. The example shown in FIG. 7 has a second pattern string disposed in parallel with the pattern (first pattern string) shown in FIG. 3 and being linearly symmetrical with the pattern shown in FIG. 3 in the up-down direction. When this kind of pattern is used, errors occurring, for example, when the installation positions of the pattern display member 11 and the camera 12 are deviated, can be suppressed by obtaining the average of the deviations of the positions in the y-axis direction obtained from the reflected images corresponding to the four rectangles enclosed with the rectangle AG indicated by alternate long and two short dashed lines.

Figure 8:
FIG. 8 is a view showing another example (example 2) of the pattern printed on the pattern display member 11 according to the first embodiment.
Figure 9:
FIG. 9 is a view showing another example (example 3) of the pattern printed on the pattern display member 11 according to the first embodiment.
Figure 10:
FIG. 10 is a view showing another example (example 4) of the pattern printed on the pattern display member 11 according to the first embodiment.

FIG. 8, FIG. 9 and FIG. 10 are views showing other examples (examples 2 to 4) of the pattern printed on the pattern display member 11. In the case where the zigzag line shown in FIG. 8 is used, as in the case shown in FIG. 3, in each element of the pattern, one end and the other end of each element of the pattern in the direction perpendicular to the x-axis direction (the extension direction of the pattern display member 11) are deviated in the x-axis direction, whereby the reflected image on the front face can be prevented from being overlapped with the reflected image on the back face even if the thickness is thinner.

In the case where a zigzag line is formed of blocks arranged at intervals as shown in FIG. 9, the reflected image on the front face can be prevented from being overlapped with the reflected image on the back face even if the thickness is thinner, and the separation between the elements is made easy.

Furthermore, as shown in FIG. 10, a line having a sine curve (sine wave) obtained by rounding the corners of a zigzag line may also be used. This configuration is preferable in that points having no information in the x-axis direction are eliminated.

In the above-mentioned embodiment, although the position of the front face of the glass plate G in the thickness direction and the position of the back face thereof in the thickness direction are calculated, only either one of the positions may be calculated.

Moreover, in the above-mentioned embodiment, although the pattern is printed on the pattern display member 11, it may be possible that a pattern display device is provided instead of the pattern display member 11 so that the pattern display device displays the pattern and the reflected images of the pattern are captured by an image capturing device 1. As a displaying method using the pattern display device, LEDs (Light Electric Diodes) may be arranged in the form of the pattern so that the LEDs emit light, or a slit with an opening having the shape of the pattern may be disposed on the front face of a light emitting device, such as LEDs.

As described above, the shape measuring device 10 includes the camera 12 (image pick-up section) that captures the reflected images of a predetermined pattern on the front face and the back face of a transparent measurement object and the calculating device 13 (calculating section and determining section) that calculates the shape of the front face or the back face by using the reflected images captured by the camera 12, and the predetermined pattern is formed of elements, one end and the other end of each element in the separation direction (y-axis direction) in which the reflected image on the back face is deviated from the reflected image on the front face being deviated in the extension direction (x-axis direction) perpendicular to the separation direction.

Hence, the reflected image on the front face can be prevented from being overlapped with the reflected image on the back face even if the thickness is thinner. Consequently, by the use of the entire reflected image on the face whose position is measured, the position of the face in the thickness direction can be calculated accurately.

In another mode according to the present invention, elements are arranged repeatedly, and the elements are separated from one another.

Hence, the reflected images of the respective elements can be separated easily. Consequently, the position of the front face or the back face in the thickness direction can be calculated accurately without being affected by the mutual interference of the reflected images of the elements.

Furthermore, in another mode according to the present invention, the second direction of a rectangle (first element) inclined to the right is opposite to the second direction of a rectangle (second element) inclined to the left, and the rectangle inclined to the right and rectangle inclined to the left are disposed repeatedly.

Hence, errors, for example, due to improper installation of the pattern display member 11 and the camera 12, can be suppressed.

Moreover, in another mode according to the present invention, a predetermined pattern has a first pattern string in which a first element and a second element are arranged repeatedly and a second pattern string being disposed in parallel with the first pattern string and being linearly symmetrical with the first pattern string.

Hence, errors, for example, due to improper installation of the pattern display member 11 and the camera 12, can be suppressed.

Second Embodiment

Figure 11:
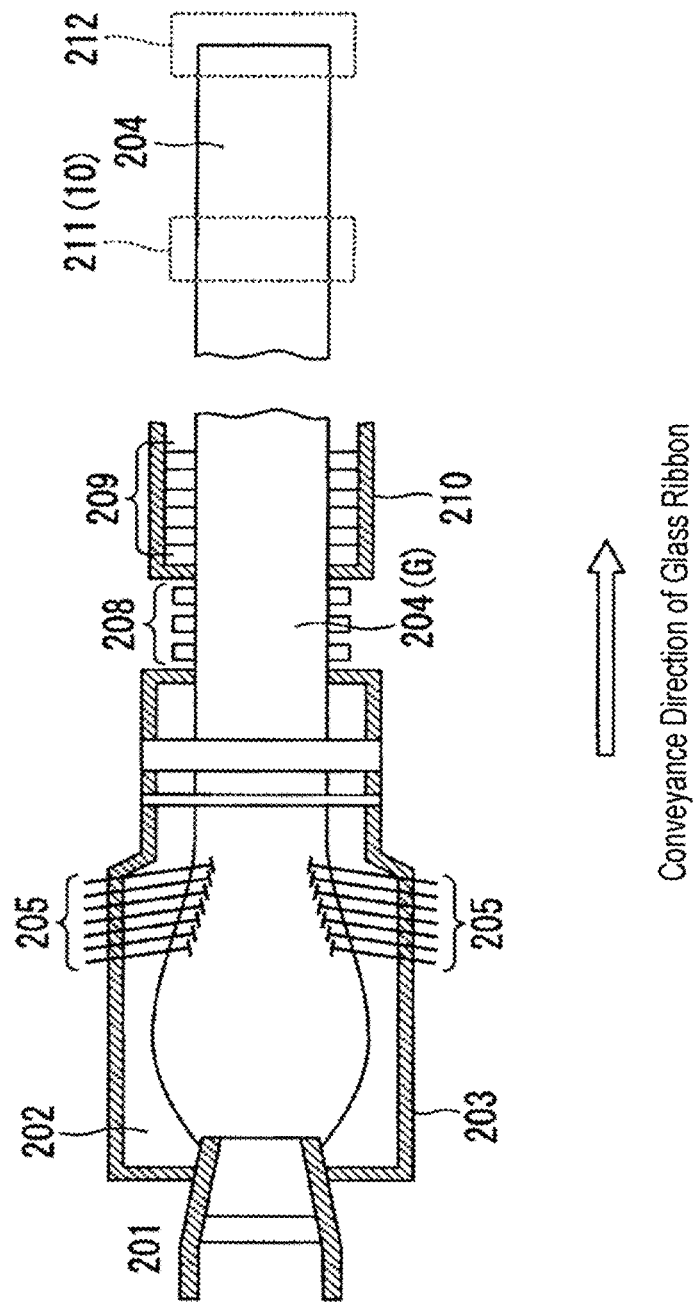
FIG. 11 is a schematic explanation diagram of a manufacturing line for glass plates according to a second embodiment of the present invention.

An example of application of the shape measuring device 10 in a manufacturing line for glass plates is described below. FIG. 11 is a schematic explanation diagram of a manufacturing line for glass plates to which the shape measuring device 10 is applied. The manufacturing method for glass plates in the manufacturing line shown in FIG. 11 includes a melting step of melting a glass raw material to obtain molten glass, a forming step of forming the molten glass into a continuous plate-shaped glass ribbon, a slow-cooling step of gradually cooling the glass ribbon by moving the glass ribbon, and a cutting step of cutting the glass ribbon; and the manufacturing method further includes a measuring step of measuring the coordinate in the height direction from the reference face of the glass ribbon using the shape measuring device in the present invention and a controlling step of controlling slow-cooling conditions in the slow-cooling step on the basis of the coordinate in the height direction obtained in the measuring step, between the slow-cooling step and the cutting step.

More specifically, during the course of manufacturing glass plates, in the case where a glass ribbon is determined to have a large warp on the basis of the result of data in the thickness direction obtained by the measuring method in the present invention, the slow-cooling conditions in the slow-cooling step, such as cooling rate conditions and cooling temperature conditions, are changed in consideration of the degree and location of the warp. This prevents a defect in the shape due to the warp or a crack due to the warp, thereby permitting the manufacturing of glass plates at a satisfactory yield.

Examples of methods for the forming step include a float method, a roll-out method, a down draw method and a fusion method, and any one of these or other methods can be appropriately employed in the present invention. In the example shown in FIG. 11, the case where the float method is used is taken as an example and described.

Figure 12:
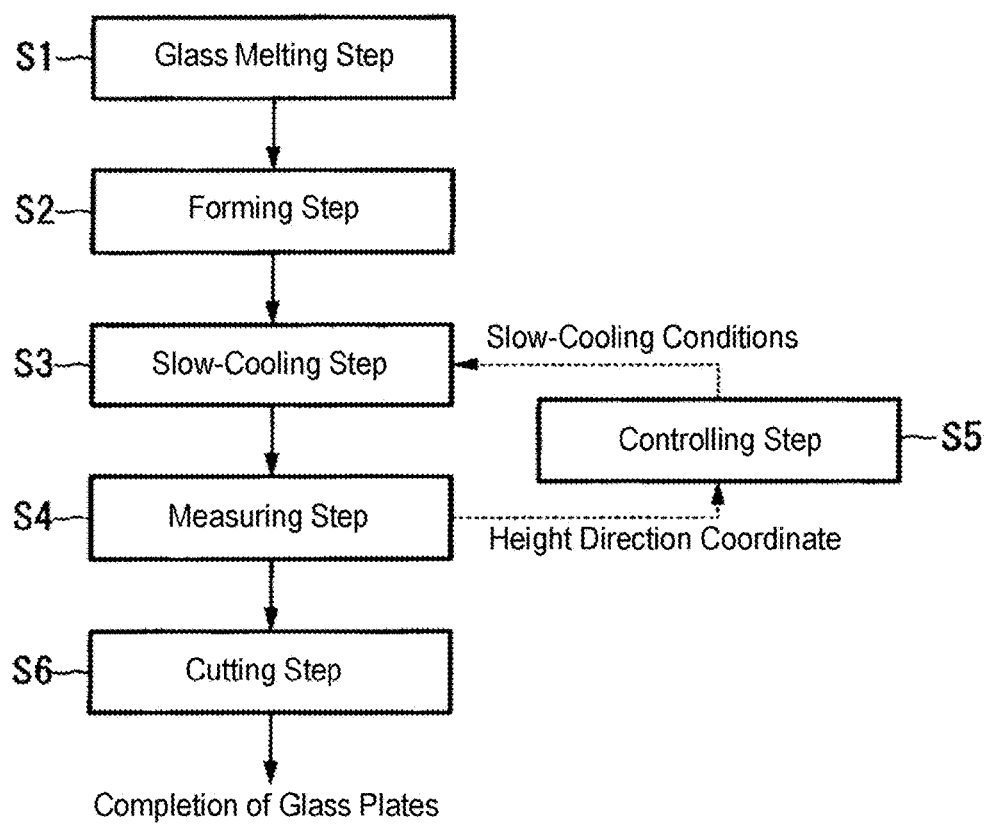
FIG. 12 is a flow chart showing the steps of a method for manufacturing a glass plate according to the second embodiment.

In the melting step (S1 in FIG. 12), a batch obtained by preparing and mixing raw materials, such as silica sand, limestone and soda ash, in accordance with the composition of glassware is supplied into a melting furnace, followed by heating and melting at a temperature of approximately 1400° C. or higher depending on the type of glass to obtain molten glass. For example, the batch is supplied into the melting furnace through one end of the melting furnace, and a flame obtained by the combustion of heavy oil or a flame obtained by the combustion of the mixture of natural gas and air is blown to the batch so that the batch is heated and melted at a temperature of approximately 1550° C. or higher to obtain molten glass. Furthermore, an electric melting furnace may also be employed to obtain molten glass.

In the forming step (S2 in FIG. 12), the molten glass obtained in the melting step is introduced through a melting furnace downstream section 201 into a molten tin bath 203 and then the molten glass is floated on molten tin 202 and moved in the conveyance direction shown in the figure, thereby being formed into a continuous plate-shaped glass ribbon 204 (corresponding to the glass plate G). At this time, in order that the glass ribbon 204 having a predetermined thickness is formed, revolving rolls (top rolls 205) are pressed against both side portions of the glass ribbon 204 in the width direction so that the glass ribbon 204 is expanded outward in the width direction (a direction perpendicular to the conveyance direction).

In the slow-cooling step (S3 in FIG. 12), the glass ribbon 204 formed as described above is extracted from the molten tin bath 203 by lift-out rolls 208, and the glass ribbon 204 is moved inside a lehr 210 in the conveyance direction shown in the figure using metallic rolls 209 so that the temperature of the glass ribbon 204 is lowered gradually and the temperature is further lowered to a temperature near room temperature in the course from the exit of the lehr 210 to the cutting step. The lehr 210 includes a structure for supplying a controlled amount of heat by using combustion gas or an electric heater so as to perform slow cooling at a necessary position inside the furnace. The temperature of the glass ribbon 204 at the exit from the lehr 210 is a temperature not more than the strain point of the glass of the glass ribbon 204, and the glass ribbon 204 is usually cooled to 150 to 250° C. depending on the type of glass. The slow-cooling step is carried out for the purpose of removing the residual stress inside the glass ribbon 204 and lowering the temperature of the glass ribbon 204. In the slow-cooling step, the glass ribbon 204 passes through a measuring section 211 (corresponding to the shape measuring device 10) and is then conveyed to a glass ribbon cutting section 212. The glass ribbon cutting section 212 cuts the glass ribbon 204 having undergone slow-cooling to have a temperature near room temperature to obtain rectangular glass plates (in the cutting step, S6 in FIG. 12). The temperature of the glass ribbon in the glass ribbon cutting section 212 is usually in the range of the ambient temperature at the place to 50° C.

The image capturing position (that is, the position of the measurement section 211) of the glass ribbon 204 in the measuring step (S4 in FIG. 12) is a position where the temperature of the glass ribbon 204 is a temperature not more than the strain point of the glass. Usually, the measuring section 211 is provided at a position on the downstream side in the conveyance direction from the glass ribbon exit of the lehr 210 and is further preferably provided at a position where the temperature of the glass ribbon 204 is not more than 200° C. Furthermore, the measurement section 211 can be provided immediately before the cutting step; however, in the case where the data obtained from the measuring step is to be reflected to the cutting step, it is preferable that the measuring section 211 should be provided at a position away from the cutting position by 30 cm or greater, more particularly by 1 m or greater, depending on the movement speed of the glass ribbon 204.

In the controlling step (S5 in FIG. 12), controlling means (not shown) that calculates the slow-cooling conditions inside the lehr 210 is utilized on the basis of the coordinates in the thickness direction obtained in the measuring step. In response to the instructions of the slow-cooling conditions to be delivered to the lehr 210, the controlling means changes the conditions for the combustion gas, the electric heater, etc. provided inside the lehr 210. Hence, control can be performed to suppress deformation, such as warp, by changing the energy to be supplied partly to the glass ribbon 204 or by changing the rate of the energy to be supplied thereto.

Hence, glass plates having high quality with respect to the shape can be produced by using the measurement result of the position of the front face or the back face in the thickness direction.

Furthermore, the calculating device 13 may be realized by recording programs for realizing the function of the calculating device 13 shown in FIG. 1 on a computer-readable recording medium and by causing a computer system to read and execute the programs recorded on the recording medium. The "computer system" herein includes an OS, and hardware such as peripheral devices.

In addition, the "computer-readable recording medium" is a portable medium, such as a flexible disk, a magneto-optical disc, a ROM or a CD-ROM, or a storage device, such as a hard disk built in the computer system. Furthermore, the "computer-readable recording medium" includes a medium that holds programs dynamically for a short time, such as communication lines to be used in the case where programs are transmitted via a network, such as the Internet, or via communication lines, such as telephone lines, and also includes a medium that holds programs for a certain time, such as a volatile memory inside a computer system serving as a server or a client in the case of the transmission. What's more, the above-mentioned programs may be programs for realizing a part of the above-mentioned function, and still further, the programs may be those capable of realizing the above-mentioned function by the combination with programs having already been stored in the computer system.

In the above-mentioned embodiment, although it is assumed that glass is used as a measurement object, the present invention can be applied to the inspection of transparent flat plates, such as resin plates.

The embodiments of the present invention have been described above in detail with reference to the drawings; however, the specific configurations of the invention are not limited to those of the embodiments, and configurations changed, for example, in design without departing from the spirit of the present invention are also included.

The present application is based on Japanese Patent Application No. 2013-272661 filed on Dec. 27, 2013, the contents of which are herein incorporated by reference.

INDUSTRIAL APPLICABILITY

In the present invention, the position of the front face or the back face of a measurement object in the thickness direction can be calculated accurately even if the measurement object is thinner.

DESCRIPTION OF REFERENCE NUMERALS AND SIGNS

10 . . . shape measuring device
11 . . . pattern display member
12 . . . camera
13 . . . calculating device
31 . . . reflected image capturing section
32 . . . separating section
33 . . . front face position calculating section
34 . . . back face position calculating section

The invention claimed is:

1. A shape measuring device comprising:
a predetermined pattern disposed on one side or the other side facing a measurement object which is a transparent flat plate;
an image pick-up section that is configured such that respective reflected images of the predetermined pattern on a front face and back face of the measurement object is separated in a separation direction perpendicular to an extension direction of the predetermined pattern, the image pick-up section being configured to capture the reflected images of the predetermined pattern on the front face and back face of the measurement object to thereby generate an image including the respective reflected images on the front face and back face;
a calculating section that calculates an inclination angle of at least the front face or the back face from the reflected images captured by the image pick-up section on the basis of a positional relation between the measurement object, the predetermined pattern and the image pick-up section; and
a determining section that determines a shape of at least the front face or the back face on the basis of the inclination angle calculated, wherein
the predetermined pattern includes a plurality of elements, and one end and the other end of each element of the plurality of elements, which are formed in a direction perpendicular to the extension direction, are deviated from each other in the extension direction.

2. The shape measuring device according to claim 1, wherein the each element of the plurality of elements is arranged repeatedly in the extension direction.

3. The shape measuring device according to claim 1, wherein the each element of the plurality of elements is formed into a long shape.

4. The shape measuring device according to claim 1, wherein, in a first element and second element of the plurality of elements, the first element and second element being adjacent to each other, the first element is formed so as to be deviated in a first direction which is one direction along the extension direction from one end to the other end of the first element, and the second element is formed so as to be deviated in a second direction which is the other direction along the extension direction from one end to the other end on the side of the first element.

5. The shape measuring device according to claim 1, wherein the each element of the plurality of elements is formed so as to be separated from one another.

6. The shape measuring device according to claim 1, wherein the predetermined pattern is formed into a sine wave shape by the plurality of elements.

7. The shape measuring device according to claim 1, wherein the predetermined pattern has a first pattern string formed of the plurality of elements and a second pattern string disposed in parallel with the first pattern string, the second pattern string being linearly symmetrical with the first pattern string.

8. A shape measuring method comprising:
a first step of capturing respective reflected images of a predetermined pattern on a front face and back face of a measurement object as an image separated in a separation direction perpendicular to an extension direction of the predetermined pattern, the predetermined pattern being disposed on one side or the other side facing the measurement object which is a transparent flat plate;

a second step of calculating an inclination angle of at least the front face or the back face from the reflected images captured in the first step on the basis of a positional relation between the measurement object, the predetermined pattern and a position where the images have been captured; and a third step of determining a shape of at least the front face or the back face on the basis of the inclination angle calculated, wherein the predetermined pattern includes a plurality of elements, and one end and the other end of each element of the plurality of elements, which are formed in a direction perpendicular to the extension direction, are deviated from each other in the extension direction.

9. The shape measuring method according to claim 8, wherein the each element of the plurality of elements is arranged repeatedly in the extension direction.

10. The shape measuring method according to claim 8, wherein the each element of the plurality of elements is formed into a long shape.

11. The shape measuring method according to claim 8, wherein, in a first element and second element of the plurality of elements, the first element and second element being adjacent to each other, the first element is formed so as to be deviated in a first direction which is one direction along the extension direction from one end to the other end of the first element, and the second element is formed so as to be deviated in a second direction which is the other direction along the extension direction from one end to the other end on the side of the first element.

12. The shape measuring method according to claim 8, wherein the each element of the plurality of elements is formed so as to be separated from one another.

13. The shape measuring method according to claim 8, wherein the predetermined pattern is formed into a sine wave shape by the plurality of elements.

14. A method for manufacturing a glass plate, comprising:
a melting step of melting a glass raw material to obtain molten glass; a forming step of forming the molten glass into a continuous plate-shaped glass ribbon; a slow-cooling step of gradually cooling the glass ribbon by moving the glass ribbon; a measuring step of measuring a shape of a front face of the glass ribbon; a cutting step of cutting the glass ribbon; and a controlling step of controlling slow-cooling conditions in the slow-cooling step on the basis of a measurement result in the measuring step, wherein the measuring step is a step in which measurement is performed by using the shape measuring method according to claim 8 in which the glass ribbon is used as the measurement object.

\* \* \* \* \*